US011838480B2

(12) United States Patent
Schwartz et al.

(10) Patent No.: US 11,838,480 B2
(45) Date of Patent: Dec. 5, 2023

(54) ELECTROPHOTOGRAPHIC PRINTING SYSTEM INCLUDING LATERAL TRANSLATIONS TO REDUCE BURN-IN ARTIFACTS

(71) Applicant: Eastman Kodak Company, Rochester, NY (US)

(72) Inventors: Thomas L. Schwartz, Fairport, NY (US); Horia Neamtu, Webster, NY (US); Chung-Hui Kuo, Fairport, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 17/952,415

(22) Filed: Sep. 26, 2022

(65) Prior Publication Data

US 2023/0138562 A1 May 4, 2023

Related U.S. Application Data

(63) Continuation of application No. 17/518,664, filed on Nov. 4, 2021, now Pat. No. 11,470,220.

(51) Int. Cl.
*H04N 1/387* (2006.01)
*G06T 7/00* (2017.01)
(Continued)

(52) U.S. Cl.
CPC .......... *H04N 1/3872* (2013.01); *G03G 15/50* (2013.01); *G06T 3/20* (2013.01); *G06T 7/0004* (2013.01); *H04N 1/00005* (2013.01); *H04N 1/00015* (2013.01); *H04N 1/00034* (2013.01); *H04N 1/00045* (2013.01); *H04N 1/00068* (2013.01); *H04N 1/00082* (2013.01);
(Continued)

(58) Field of Classification Search
CPC .......... H04N 1/00005; H04N 1/00015; H04N 1/00034; H04N 1/00045; H04N 1/00068; H04N 1/00082; H04N 1/233; H04N 1/29; H04N 1/295; H04N 1/3872; G03G 15/50
See application file for complete search history.

(56) References Cited

U.S. PATENT DOCUMENTS 9,091,998 B2    7/2015  Hashimoto
11,644,781 B2 * 5/2023  Kuo ................... G03G 15/5087
                                                        399/49

OTHER PUBLICATIONS

NexPress Specialty Substrate Leveler User's Guide, Eastman Kodak Co., Publication ID: UG8350-1_en. 2008.
(Continued)

*Primary Examiner* — Scott A Rogers
(74) *Attorney, Agent, or Firm* — David A. Novais

(57) ABSTRACT

A method for reducing image burn-in artifacts in an electrophotographic printing system, includes receiving a print job including image data for a set of pages to be printed. The pages are analyzed to determine that the image data for a sequence of pages in the print job are similar. The similar pages are printed using a pattern of lateral translations wherein the image data is laterally translated such that it is printed at a different lateral position on the printed page. The similar pages can also be printed using a pattern of page orientations including a first page orientation and a second page orientation, wherein the image data for the second page orientation is rotated 180 degrees relative to the image data for the first page orientation.

10 Claims, 13 Drawing Sheets

(51) Int. Cl.
*G06T 3/20* (2006.01)
*H04N 1/00* (2006.01)
*H04N 1/23* (2006.01)
*G03G 15/00* (2006.01)
*H04N 1/29* (2006.01)

(52) U.S. Cl.
CPC ............ *H04N 1/233* (2013.01); *H04N 1/295* (2013.01); *G06T 2207/30144* (2013.01)

(56) References Cited

OTHER PUBLICATIONS

Kodak Digital Press: Printing on Pre-Collated Media (PCM) User Guide, Publication ID: UGSU00-00, 2019.

* cited by examiner

ELECTROPHOTOGRAPHIC PRINTING SYSTEM INCLUDING LATERAL TRANSLATIONS TO REDUCE BURN-IN ARTIFACTS

CROSS-REFERENCE TO RELATED APPLICATIONS

This application is a continuation of prior U.S. patent application Ser. No. 17/518,664, filed Nov. 4, 2021, which is hereby incorporated herein by reference in its entirety.

Reference is made to commonly assigned, co-pending U.S. patent application Ser. No. 17/518,645, entitled: "Electrophotographic printing system with reduced burn-in artifacts", by T. Schwartz et al.; to commonly assigned, co-pending U.S. patent application Ser. No. 17/516,800, entitled: "Printing system for media with non-uniform thickness", by T. Schwartz et al.; to commonly assigned, co-pending U.S. patent application Ser. No. 17/516,820, entitled: "Printing system for media with asymmetric characteristics", by C. H. Kuo et al.; to commonly assigned, co-pending U.S. patent application Ser. No. 17/516,827, entitled: "Printing system for printing on tabbed media", by C. H. Kuo et al.; and to commonly assigned, U.S. Patent Application Ser. No. 63/166,266, entitled: "Electrophotographic printing system with reduced burn-in artifacts", by T. Schwartz et al., each of which is incorporated herein by reference.

FIELD OF THE INVENTION

This invention pertains to the field of digital printing, and more particularly to printing on media having non-uniform thickness profile characteristics.

BACKGROUND OF THE INVENTION

Electrophotography is a useful process for printing images on a receiver (or "imaging substrate"), such as a piece or sheet of paper or another planar medium (e.g., glass, fabric, metal, or other objects) as will be described below. In this process, an electrostatic latent image is formed on a photoreceptor by uniformly charging the photoreceptor and then discharging selected areas of the uniform charge to yield an electrostatic charge pattern corresponding to the desired image (i.e., a "latent image").

After the latent image is formed, charged toner particles are brought into the vicinity of the photoreceptor and are attracted to the latent image to develop the latent image into a toner image. Note that the toner image may not be visible to the naked eye depending on the composition of the toner particles (e.g., clear toner).

After the latent image is developed into a toner image on the photoreceptor, a suitable receiver is brought into juxtaposition with the toner image. A suitable electric field is applied to transfer the toner particles of the toner image to the receiver to form the desired print image on the receiver. The imaging process is typically repeated many times with reusable photoreceptors.

The receiver is then removed from its operative association with the photoreceptor and subjected to heat or pressure to permanently fix (i.e., "fuse") the print image to the receiver. Plural print images (e.g., separation images of different colors) can be overlaid on the receiver before fusing to form a multicolor print image on the receiver.

One problem that can occur in electrophotographic printing systems is known as "image burn-in" which occurs when a sequence of the same or similar pages having similar image data or patterns are printed. In this case, the performance of various system components can change as a function of position due to the repeated printing of the similar image data or patterns. This can cause subsequently printed images to have characteristics that vary in accordance with the repeated image data or pattern, thereby having a negative impact on image quality. Such artifacts are commonly referred to as "image burn-in artifacts." This can require that the affected system components be more frequently serviced or even replaced to eliminate the artifacts which can add significant cost and system down-time.

There remains a need for an improved method to reduce image burn-in artifacts in an electrophotographic printing system when printing an extended sequence of similar pages.

SUMMARY OF THE INVENTION

The present invention relates to a method for reducing image burn-in artifacts in an electrophotographic printing system, including:
  receiving a print job including image data for a set of pages to be printed with the electrophotographic printing system;
  determining that the image data for a sequence of pages in the print job are similar; and
  using an electrophotographic print engine to print the similar pages using a pattern of lateral translations wherein the image data is laterally translated such that it is printed at a different lateral position on the printed page.

This invention has the advantage that image burn-in artifacts can be reduced.

It has the additional advantage that components of the printing system will need to be replaced or reconditioned less frequently, thereby reducing cost and system downtime.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
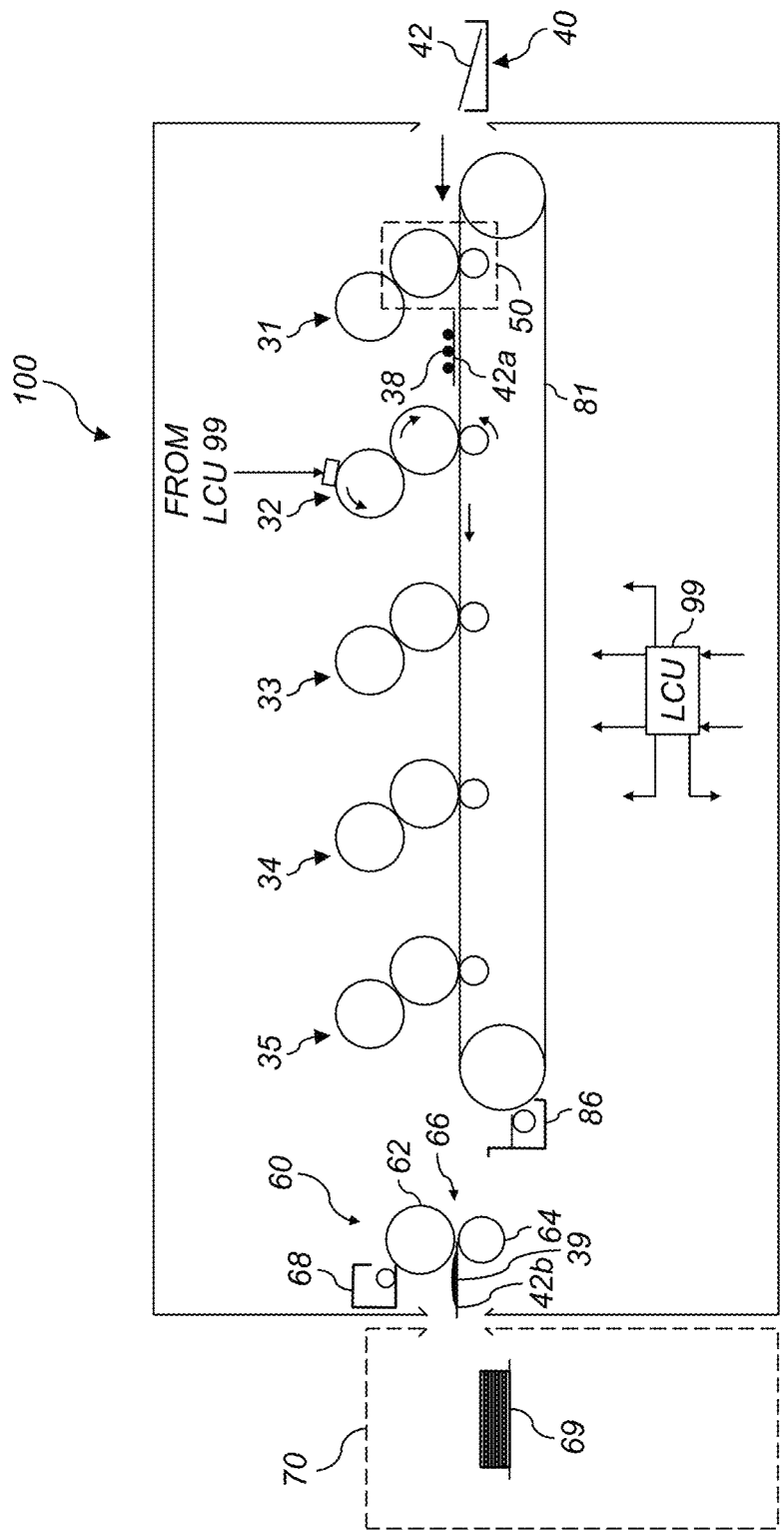
FIG. 1 is an elevational cross-section of an electrophotographic printer suitable for use with various embodiments.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated, or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

As used herein, "toner particles" are particles of one or more material(s) that are transferred by an electrophotographic (EP) printer to a receiver to produce a desired effect or structure (e.g., a print image, texture, pattern, or coating) on the receiver. Toner particles can be ground from larger solids, or chemically prepared (e.g., precipitated from a solution of a pigment and a dispersant using an organic solvent), as is known in the art. Toner particles can have a range of diameters (e.g., less than 8 µm, on the order of 10-15 µm, up to approximately 30 µm, or larger), where "diameter" preferably refers to the volume-weighted median diameter, as determined by a device such as a Coulter Multisizer. When practicing this invention, it is preferable to use larger toner particles (i.e., those having diameters of at least 20 µm) in order to obtain the desirable toner stack heights that would enable macroscopic toner relief structures to be formed.

"Toner" refers to a material or mixture that contains toner particles, and that can be used to form an image, pattern, or coating when deposited on an imaging member including a photoreceptor, a photoconductor, or an electrostatically-charged or magnetic surface. Toner can be transferred from the imaging member to a receiver. Toner is also referred to in the art as marking particles, dry ink, or developer, but note that herein "developer" is used differently, as described below. Toner can be a dry mixture of particles or a suspension of particles in a liquid toner base.

As mentioned already, toner includes toner particles; it can also include other types of particles. The particles in toner can be of various types and have various properties. Such properties can include absorption of incident electromagnetic radiation (e.g., particles containing colorants such as dyes or pigments), absorption of moisture or gasses (e.g., desiccants or getters), suppression of bacterial growth (e.g., biocides, particularly useful in liquid-toner systems), adhesion to the receiver (e.g., binders), electrical conductivity or low magnetic reluctance (e.g., metal particles), electrical resistivity, texture, gloss, magnetic remanence, florescence, resistance to etchants, and other properties of additives known in the art.

In single-component or mono-component development systems, "developer" refers to toner alone. In these systems, none, some, or all of the particles in the toner can themselves be magnetic. However, developer in a mono-component system does not include magnetic carrier particles. In dual-component, two-component, or multi-component development systems, "developer" refers to a mixture including toner particles and magnetic carrier particles, which can be electrically-conductive or -non-conductive. Toner particles can be magnetic or non-magnetic. The carrier particles can be larger than the toner particles (e.g., 15-20 µm or 20-300 µm in diameter). A magnetic field is used to move the developer in these systems by exerting a force on the magnetic carrier particles. The developer is moved into proximity with an imaging member or transfer member by the magnetic field, and the toner or toner particles in the developer are transferred from the developer to the member by an electric field, as will be described further below. The magnetic carrier particles are not intentionally deposited on the member by action of the electric field; only the toner is intentionally deposited. However, magnetic carrier particles, and other particles in the toner or developer, can be unintentionally transferred to an imaging member. Developer can include other additives known in the art, such as those listed above for toner. Toner and carrier particles can be substantially spherical or non-spherical.

The electrophotographic process can be embodied in devices including printers, copiers, scanners, and facsimiles, and analog or digital devices, all of which are referred to herein as "printers." Various embodiments described herein are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields). The present invention can be practiced using any type of electrographic printing system, including electrophotographic and ionographic printers.

A digital reproduction printing system ("printer") typically includes a digital front-end processor (DFE), a print engine (also referred to in the art as a "printing module" or a "marking engine") for applying toner to the receiver, and one or more post-printing finishing system(s) (e.g., a UV coating system, a glosser system, or a laminator system). A printer can reproduce pleasing black-and-white or color images onto a receiver. A printer can also produce selected patterns of toner on a receiver, which patterns (e.g., surface textures) do not correspond directly to a visible image.

The DFE receives input electronic files (such as Postscript command files) composed of images from other input devices (e.g., a scanner, a digital camera or a computer-generated image processor). Within the context of the present invention, images can include photographic renditions of scenes, as well as other types of visual content such as text or graphical elements. Images can also include invisible content such as specifications of texture, gloss or protective coating patterns.

The DFE can include various function processors, such as a raster image processor (RIP), image positioning processor, image manipulation processor, color processor, or image storage processor. The DFE rasterizes input electronic files into image bitmaps for the printing module to print. In some embodiments, the DFE permits a human operator to set up parameters such as layout, font, color, paper type, or post-finishing options. The printing module takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system that accounts for characteristics of the image printing process implemented in the printing module (e.g., the electrophotographic process) to provide known, consistent color reproduction characteristics. The color management system can also provide known color reproduction for different inputs (e.g., digital camera images or film images). Color management systems are well-known in the art, and any such system can be used to provide color corrections in accordance with the present invention.

In an embodiment of an electrophotographic modular printing machine useful with various embodiments (e.g., the NEXPRESS SX 3900 printer manufactured by Eastman Kodak Company of Rochester, NY) color-toner print images are made in a plurality of color imaging modules arranged in tandem, and the print images are successively electrostatically transferred to a receiver adhered to a transport web moving through the modules. Colored toners include colorants, (e.g., dyes or pigments) which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. The provision of a clear-toner overcoat to a color print is desirable for providing features such as protecting the print from fingerprints, reducing certain visual artifacts or providing desired texture or surface finish characteristics. Clear toner uses particles that are similar to the toner particles of the color development stations but without colored material (e.g., dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective color toners are deposited one upon the other at respective locations on the receiver and the height of a respective color toner stack is the sum of the toner heights of each respective color. Uniform stack height provides the print with a more even or uniform gloss.

Figure 2:
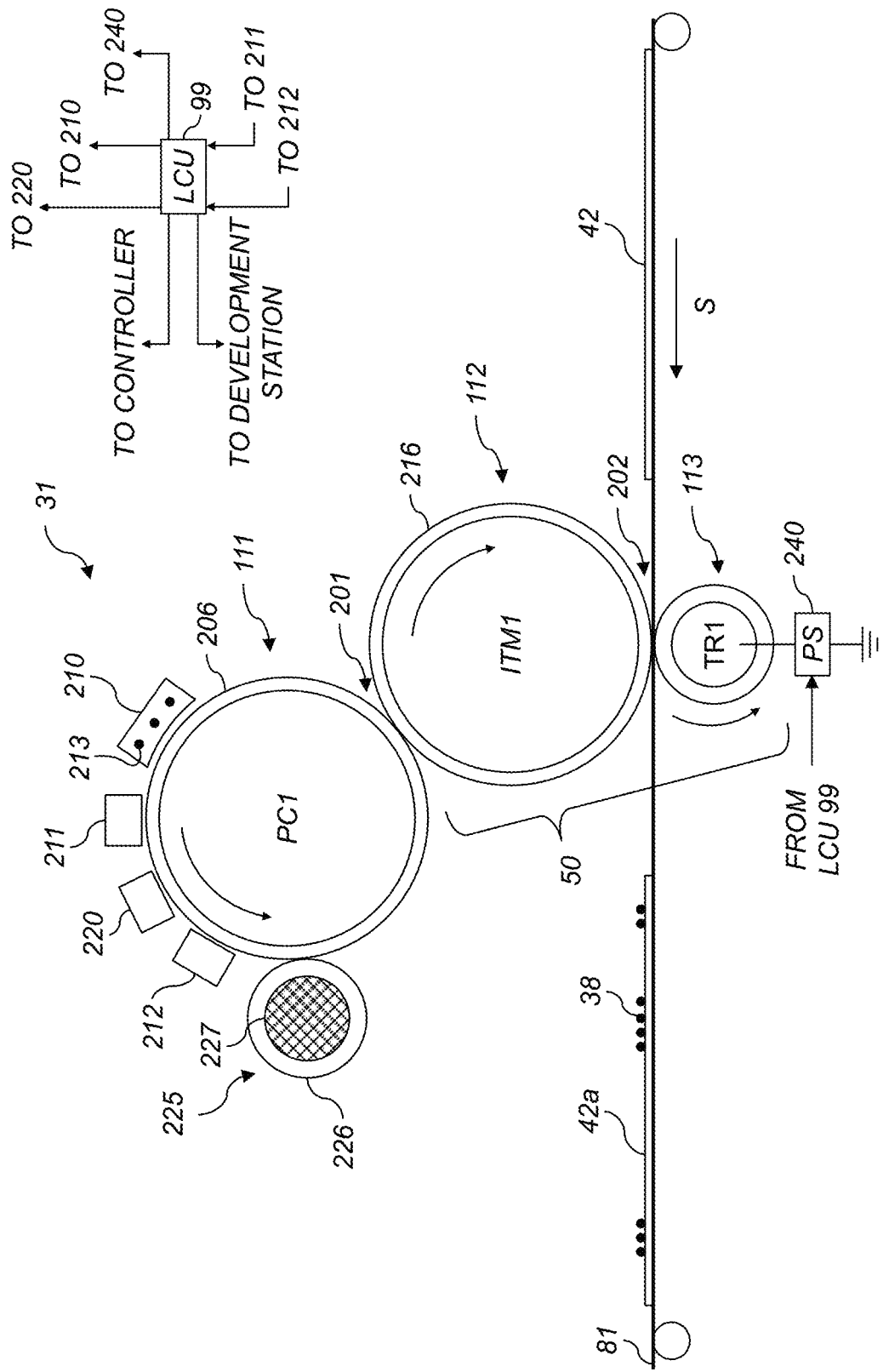
FIG. 2 is an elevational cross-section of one printing module of the electrophotographic printer of FIG. 1.

FIGS. 1-2 are elevational cross-sections showing portions of a typical electrophotographic printer 100 useful with various embodiments. Printer 100 is adapted to produce images, such as single-color images (i.e., monochrome images), or multicolor images such as CMYK, or pentachrome (five-color) images, on a receiver. Multicolor images are also known as "multi-component" images. One embodiment involves printing using an electrophotographic print engine having five sets of single-color image-producing or image-printing stations or modules arranged in tandem, but more or less than five colors can be combined on a single receiver. Other electrophotographic writers or printer apparatuses can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, also known as electrophotographic imaging subsystems. Each printing module 31, 32, 33, 34, 35 produces a single-color toner image for transfer using a respective transfer subsystem 50 (for clarity, only one is labeled) to a receiver 42 successively moved through the modules. In some embodiments one or more of the printing module 31, 32, 33, 34, 35 can print a colorless toner image, which can be used to provide a protective overcoat or tactile image features. Receiver 42 is transported from supply unit 40, which can include active feeding subsystems as known in the art, into printer 100 using a transport web 81. In various embodiments, the visible image can be transferred directly from an imaging roller to a receiver, or from an imaging roller to one or more transfer roller(s) or belt(s) in sequence in transfer subsystem 50, and then to receiver 42. Receiver 42 is, for example, a selected section of a web or a cut sheet of a planar receiver media such as paper or transparency film.

In the illustrated embodiments, each receiver 42 can have up to five single-color toner images transferred in registration thereon during a single pass through the five printing modules 31, 32, 33, 34, 35 to form a pentachrome image. As used herein, the term "pentachrome" implies that in a print image, combinations of various of the five colors are combined to form other colors on the receiver at various locations on the receiver, and that all five colors participate to form process colors in at least some of the subsets. That is, each of the five colors of toner can be combined with toner of one or more of the other colors at a particular location on the receiver to form a color different than the colors of the toners combined at that location. In an exemplary embodiment, printing module 31 forms black (K) print images, printing module 32 forms yellow (Y) print images, printing module 33 forms magenta (M) print images, and printing module 34 forms cyan (C) print images.

Printing module 35 can form a red, blue, green, or other fifth print image, including an image formed from a clear toner (e.g., one lacking pigment). The four subtractive primary colors, cyan, magenta, yellow, and black, can be combined in various combinations of subsets thereof to form a representative spectrum of colors. The color gamut of a printer (i.e., the range of colors that can be produced by the printer) is dependent upon the materials used and the process used for forming the colors. The fifth color can therefore be added to improve the color gamut. In addition to adding to the color gamut, the fifth color can also be a specialty color toner or spot color, such as for making proprietary logos or colors that cannot be produced with only CMYK colors (e.g., metallic, fluorescent, or pearlescent colors), or a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42a is shown after passing through printing module 31. Print image 38 on receiver 42a includes unfused toner particles. Subsequent to transfer of the respective print images, overlaid in registration, one from each of the respective printing modules 31, 32, 33, 34, 35, receiver 42a is advanced to a fuser module 60 (i.e., a fusing or fixing assembly) to fuse the print image 38 to the receiver 42a. Transport web 81 transports the print-image-carrying receivers to the fuser module 60, which fixes the toner particles to the respective receivers, generally by the application of heat and pressure. The receivers are serially de-tacked from the transport web 81 to permit them to feed cleanly into the fuser module 60. The transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along the transport web 81 before or after cleaning station 86 in the direction of rotation of transport web 81.

In the illustrated embodiment, the fuser module 60 includes a heated fusing roller 62 and an opposing pressure roller 64 that form a fusing nip 66 therebetween. In an embodiment, fuser module 60 also includes a release fluid application substation 68 that applies release fluid, e.g., silicone oil, to fusing roller 62. Alternatively, wax-containing toner can be used without applying release fluid to the fusing roller 62. Other embodiments of fusers, both contact and non-contact, can be employed. For example, solvent fixing uses solvents to soften the toner particles so they bond with the receiver. Photoflash fusing uses short bursts of high-frequency electromagnetic radiation (e.g., ultraviolet light) to melt the toner. Radiant fixing uses lower-frequency electromagnetic radiation (e.g., infrared light) to more slowly melt the toner. Microwave fixing uses electromagnetic radiation in the microwave range to heat the receivers (primarily), thereby causing the toner particles to melt by heat conduction, so that the toner is fixed to the receiver.

The fused receivers (e.g., receiver 42b carrying fused image 39) are transported in series from the fuser module 60 along a path either to an output tray 69, or back to printing modules 31, 32, 33, 34, 35 to form an image on the backside of the receiver (i.e., to form a duplex print). Receivers 42b can also be transported to any suitable output accessory. For example, an auxiliary fuser or glossing assembly can provide a clear-toner overcoat. Printer 100 can also include multiple fuser modules 60 to support applications such as overprinting, as known in the art.

In various embodiments, between the fuser module 60 and the output tray 69, receiver 42b passes through a finishing system 70. Finishing system 70 performs various paper-handling operations, such as folding, stapling, saddle-stitching, collating, and binding.

Printer 100 includes main printer apparatus logic and control unit (LCU) 99, which receives input signals from various sensors associated with printer 100 and sends control signals to various components of printer 100. LCU 99 can include a microprocessor incorporating suitable look-up tables and control software executable by the LCU 99. It can also include a field-programmable gate array (FPGA), programmable logic device (PLD), programmable logic controller (PLC) (with a program in, e.g., ladder logic), microcontroller, or other digital control system. LCU 99 can include memory for storing control software and data. In some embodiments, sensors associated with the fuser module 60 provide appropriate signals to the LCU 99. In response to the sensor signals, the LCU 99 issues command and control signals that adjust the heat or pressure within fusing nip 66 and other operating parameters of fuser module 60. This permits printer 100 to print on receivers of various thicknesses and surface finishes, such as glossy or matte.

Image data for printing by printer 100 can be processed by a raster image processor (RIP; not shown), which can include a color separation screen generator or generators. The output of the RIP can be stored in frame or line buffers for transmission of the color separation print data to each of a set of respective LED writers associated with the printing modules 31, 32, 33, 34, 35 (e.g., for black (K), yellow (Y), magenta (M), cyan (C), and red (R) color channels, respectively). The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes (e.g., color correction) in order to obtain the desired color print. Color image data is separated into the respective colors and converted by the RIP to halftone dot image data in the respective color (for example, using halftone matrices, which provide desired screen angles and screen rulings). The RIP can be a suitably-programmed computer or logic device and is adapted to employ stored or computed halftone matrices and templates for processing separated color image data into rendered image data in the form of halftone information suitable for printing. These halftone matrices can be stored in a screen pattern memory.

FIG. 2 shows additional details of printing module 31, which is representative of printing modules 32, 33, 34, and 35 (FIG. 1). Photoreceptor 206 of imaging member 111 includes a photoconductive layer formed on an electrically conductive substrate. The photoconductive layer is an insulator in the substantial absence of light so that electric charges are retained on its surface. Upon exposure to light, the charge is dissipated. In various embodiments, photoreceptor 206 is part of, or disposed over, the surface of imaging member 111, which can be a plate, drum, or belt. Photoreceptors can include a homogeneous layer of a single material such as vitreous selenium or a composite layer containing a photoconductor and another material. Photoreceptors 206 can also contain multiple layers.

Charging subsystem 210 applies a uniform electrostatic charge to photoreceptor 206 of imaging member 111. In an exemplary embodiment, charging subsystem 210 includes a wire grid 213 having a selected voltage. Additional necessary components provided for control can be assembled about the various process elements of the respective printing modules. Meter 211 measures the uniform electrostatic charge provided by charging subsystem 210.

An exposure subsystem 220 is provided for selectively modulating the uniform electrostatic charge on photoreceptor 206 in an image-wise fashion by exposing photoreceptor 206 to electromagnetic radiation to form a latent electrostatic image. The uniformly-charged photoreceptor 206 is typically exposed to actinic radiation provided by selectively activating particular light sources in an LED array or a laser device outputting light directed onto photoreceptor 206. In embodiments using laser devices, a rotating polygon (not shown) is sometimes used to scan one or more laser beam(s) across the photoreceptor in the fast-scan direction. One pixel site is exposed at a time, and the intensity or duty cycle of the laser beam is varied at each dot site. In embodiments using an LED array, the array can include a plurality of LEDs arranged next to each other in a line, all dot sites in one row of dot sites on the photoreceptor can be selectively exposed simultaneously, and the intensity or duty cycle of each LED can be varied within a line exposure time to expose each pixel site in the row during that line exposure time.

As used herein, an "engine pixel" is the smallest addressable unit on photoreceptor 206 which the exposure subsystem 220 (e.g., the laser or the LED) can expose with a selected exposure different from the exposure of another engine pixel. Engine pixels can overlap (e.g., to increase addressability in the slow-scan direction). Each engine pixel has a corresponding engine pixel location, and the exposure applied to the engine pixel location is described by an engine pixel level.

The exposure subsystem 220 can be a write-white or write-black system. In a write-white or "charged-area-development" system, the exposure dissipates charge on areas of photoreceptor 206 to which toner should not adhere. Toner particles are charged to be attracted to the charge remaining on photoreceptor 206. The exposed areas therefore correspond to white areas of a printed page. In a write-black or "discharged-area development" system, the toner is charged to be attracted to a bias voltage applied to photoreceptor 206 and repelled from the charge on photoreceptor 206. Therefore, toner adheres to areas where the charge on photoreceptor 206 has been dissipated by exposure. The exposed areas therefore correspond to black areas of a printed page.

In the illustrated embodiment, meter 212 is provided to measure the post-exposure surface potential within a patch area of a latent image formed from time to time in a non-image area on photoreceptor 206. Other meters and components can also be included (not shown).

A development station 225 includes toning shell 226, which can be rotating or stationary, for applying toner of a selected color to the latent image on photoreceptor 206 to produce a developed image on photoreceptor 206 corresponding to the color of toner deposited at this printing module 31. Development station 225 is electrically biased by a suitable respective voltage to develop the respective latent image, which voltage can be supplied by a power supply (not shown). Developer is provided to toning shell 226 by a supply system (not shown) such as a supply roller, auger, or belt. Toner is transferred by electrostatic forces from development station 225 to photoreceptor 206. These forces can include Coulombic forces between charged toner particles and the charged electrostatic latent image, and Lorentz forces on the charged toner particles due to the electric field produced by the bias voltages.

In some embodiments, the development station 225 employs a two-component developer that includes toner particles and magnetic carrier particles. The exemplary development station 225 includes a magnetic core 227 to cause the magnetic carrier particles near toning shell 226 to form a "magnetic brush," as known in the electrophotographic art. Magnetic core 227 can be stationary or rotating, and can rotate with a speed and direction the same as or different than the speed and direction of toning shell 226. Magnetic core 227 can be cylindrical or non-cylindrical, and can include a single magnet or a plurality of magnets or magnetic poles disposed around the circumference of magnetic core 227. Alternatively, magnetic core 227 can include an array of solenoids driven to provide a magnetic field of alternating direction. Magnetic core 227 preferably provides a magnetic field of varying magnitude and direction around the outer circumference of toning shell 226. Development station 225 can also employ a mono-component developer station comprising toner, either magnetic or non-magnetic, without separate magnetic carrier particles.

Transfer subsystem 50 includes transfer backup member 113, and intermediate transfer member 112 for transferring the respective print image from photoreceptor 206 of imaging member 111 through a first transfer nip 201 to surface 216 of intermediate transfer member 112, and then to a receiver 42 which receives respective toned print images 38 from each printing module in superposition to form a composite image thereon. The print image 38 is, for example, a separation of one color, such as cyan. Receiver 42 is transported by transport web 81. Transfer to a receiver is affected by an electrical field provided to transfer backup member 113 by power source 240, which is controlled by LCU 99. Receiver 42 can be any object or surface onto which toner can be transferred from imaging member 111 by application of the electric field. In this example, receiver 42 is shown prior to entry into a second transfer nip 202, and receiver 42a is shown subsequent to transfer of the print image 38 onto receiver 42a. In the illustrated embodiment, the toner image is transferred from the photoreceptor 206 to the intermediate transfer member 112, and from there to the receiver 42. Registration of the separate toner images is achieved by registering the separate toner images on the receiver 42, as is done with the NEXPRESS SX 3900. In some embodiments, a single transfer member is used to sequentially transfer toner images from each color channel to the receiver 42. In other embodiments, the separate toner images can be transferred in register directly from the photoreceptor 206 in the respective printing module 31, 32, 33, 34, 25 to the receiver 42 without using a transfer member. Either transfer process is suitable when practicing this invention. An alternative method of transferring toner images involves transferring the separate toner images, in register, to a transfer member and then transferring the registered image to a receiver.

LCU 99 sends control signals to the charging subsystem 210, the exposure subsystem 220, and the respective development station 225 of each printing module 31, 32, 33, 34, 35 (FIG. 1), among other components. Each printing module can also have its own respective controller (not shown) coupled to LCU 99.

As discussed in the background section, one problem that can occur in electrophotographic printing systems is known as "image burn-in" which can occur when a sequence of the same or similar pages having similar image data or patterns are printed. In this case, the performance of various system components can change as a function of position due to the repeated printing of the similar image data or patterns. This can cause subsequently printed images to have characteristics that vary in accordance with the repeated image data or pattern (i.e., "image burn-in artifacts"). This can require that the affected system components be frequently serviced, or even replaced, to eliminate the artifacts which can add significant cost and system down-time.

One system component that has been found to be particularly susceptible to the formation of image burn-in artifacts is the fuser module 60 (see FIG. 1). The toner stacks that form the print image 38 on the receiver 42 generally have a higher roughness than the receiver 42. As a result, when the receiver 42 passes through the fuser module 60, the roughness of the toner can affect the surface of the fusing roller 62. If a large number of pages are printed that have high-density image content at the same cross-track position, the surface characteristics of the corresponding portion of the fusing roller 62 can be changed (e.g., roughened) relative to the portions of the fusing roller 62 that correspond to low-density image content. The spatially-dependent surface characteristics of the fusing roller 62 can then affect the image quality of subsequently printed pages. For example, the gloss of the printed image can be lower in the image regions corresponding to the roughened surface of the fusing roller 62.

Other system components besides the fuser module 60 can also contribute to the formation of burn-in artifacts. For example, the response of the photoreceptor 206 (FIG. 2) can become position dependent when the same image content is repeated imaged.

Figure 3C:
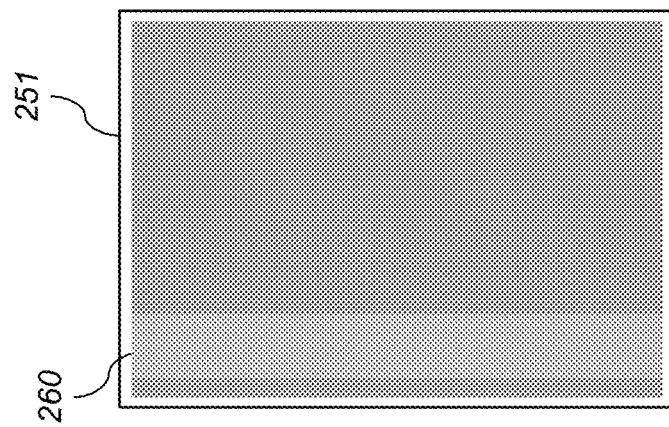
FIG. 3C illustrates image burn-in artifacts formed from the fuser roller of FIG. 3B.
Figure 3B:
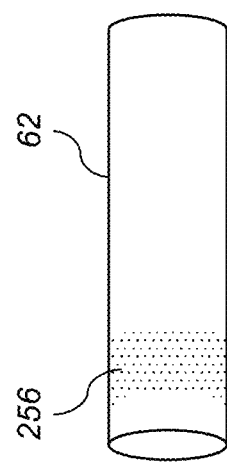
FIG. 3B illustrates a fuser roller having a roughened surface in regions corresponding to the dark image content in the page of FIG. 3A.
Figure 3A:
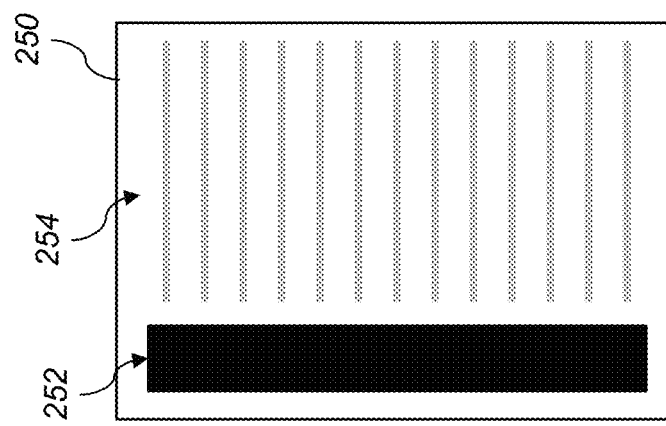
FIG. 3A is an example of a page having image content that is susceptible to producing image burn-in artifacts.

FIG. 3A shows an example of a page 250 that is susceptible to producing image burn-in artifacts when printed repeatedly. The page 250 includes dark image content 252 which occurs in a particular cross-track position together with light image content 254. Over time, the dark image content 252 can modify the surface of the fusing roller 6, producing a roughened surface 256 as shown in FIG. 3B, when many copies of the page 250 are printed. The roughened surface 256 can in turn produce image burn-in artifacts 260 in a subsequently printed page 251 (in this example a uniform gray field) as shown in FIG. 3C. In this case, the image burn-in artifacts 260 show up as a lower gloss level in the cross-track positions that correspond to the dark image content 252 in page 250.

Figure 4:
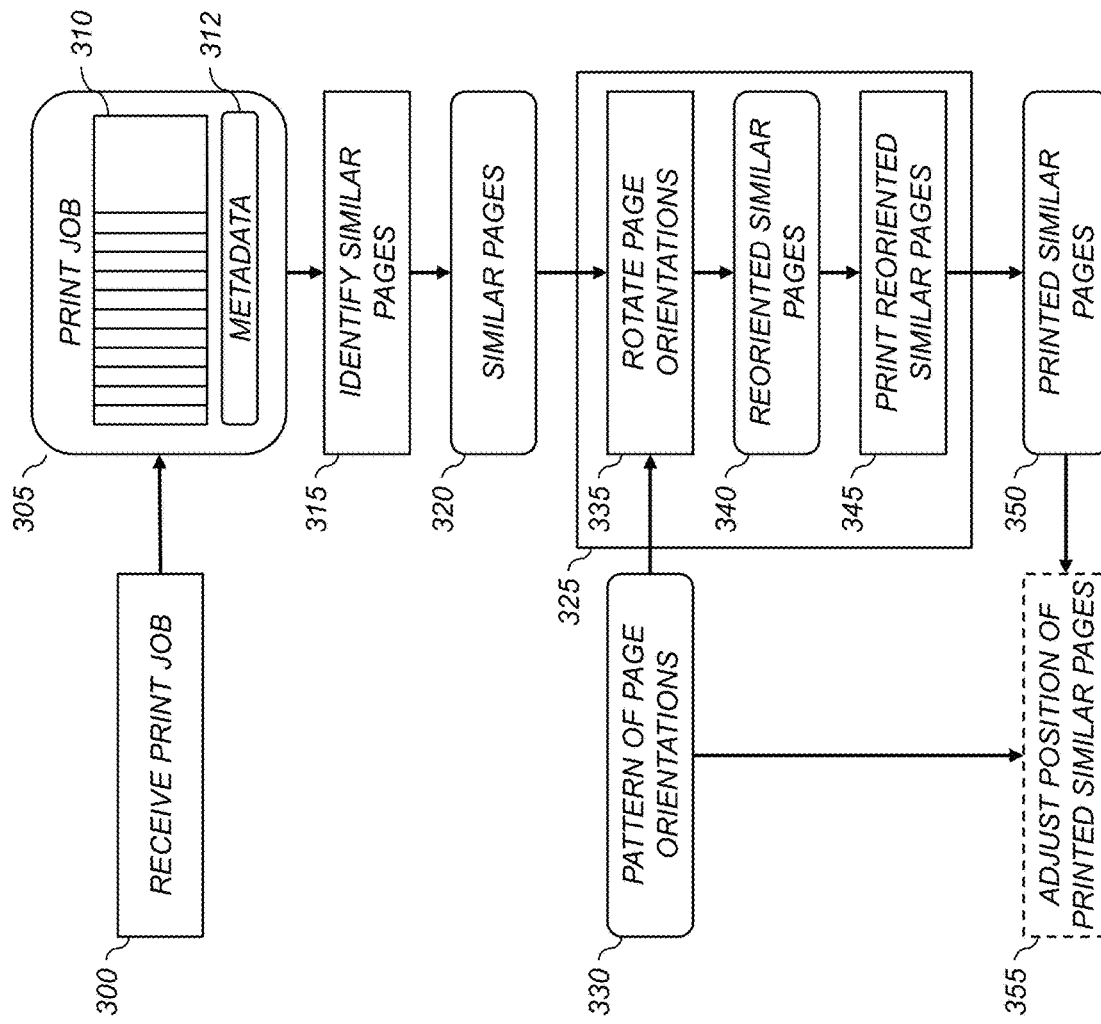
FIG. 4 is a flowchart of a method for printing similar pages using a pattern of page orientations in accordance with an exemplary embodiment.

The present invention represents a method or system for reducing image burn-in artifacts by varying the image positions when printing a sequence of similar images. FIG. 4 shows a flowchart of a method that can be used to implement the present invention in accordance with an exemplary embodiment. A print job 305 including image data a set of pages 310 is received using a receive print job step 300.

In some cases, the print job 305 may contain a sequence of pages 310 that include image data or patterns (for example, image content) that are identical or substantially similar. For example, the print job 305 may contain multiple copies of the same page 310, or may include a series of pages 310 that include similar image content (e.g., a form letter where the name and address of the recipient vary but the rest of the page content is identical). The similar pages may correspond to all of the pages 310 in the print job 305, or may correspond to a subset of the pages 310 in the print job 305.

An identify similar pages step 315 determines a sequence of similar pages 320 in the print job 305 that have the same or similar image content. In some embodiments, the identify similar pages step 315 identifies the similar pages 320 based on metadata 312 associated with the print job 305 which indicates that the print job 305 includes multiple copies of the same page 310. For example, the print job 305 may include image data for a single page 310, together with metadata 312 which instructs the printing system to print a specified number of copies of the page 310. In this case, it will be known a priori that all of the pages 310 of the print job 305 are identical, and will therefore be included in the sequence of similar pages 320.

In other embodiments, the identify similar pages step 315 determines that the image data for a sequence of pages 310 are similar by automatically analyzing the image data to compute a predefined image similarity metric, and designating sequential pages to be similar by comparing the image similarity metric to a predefined threshold.

Figure 5:
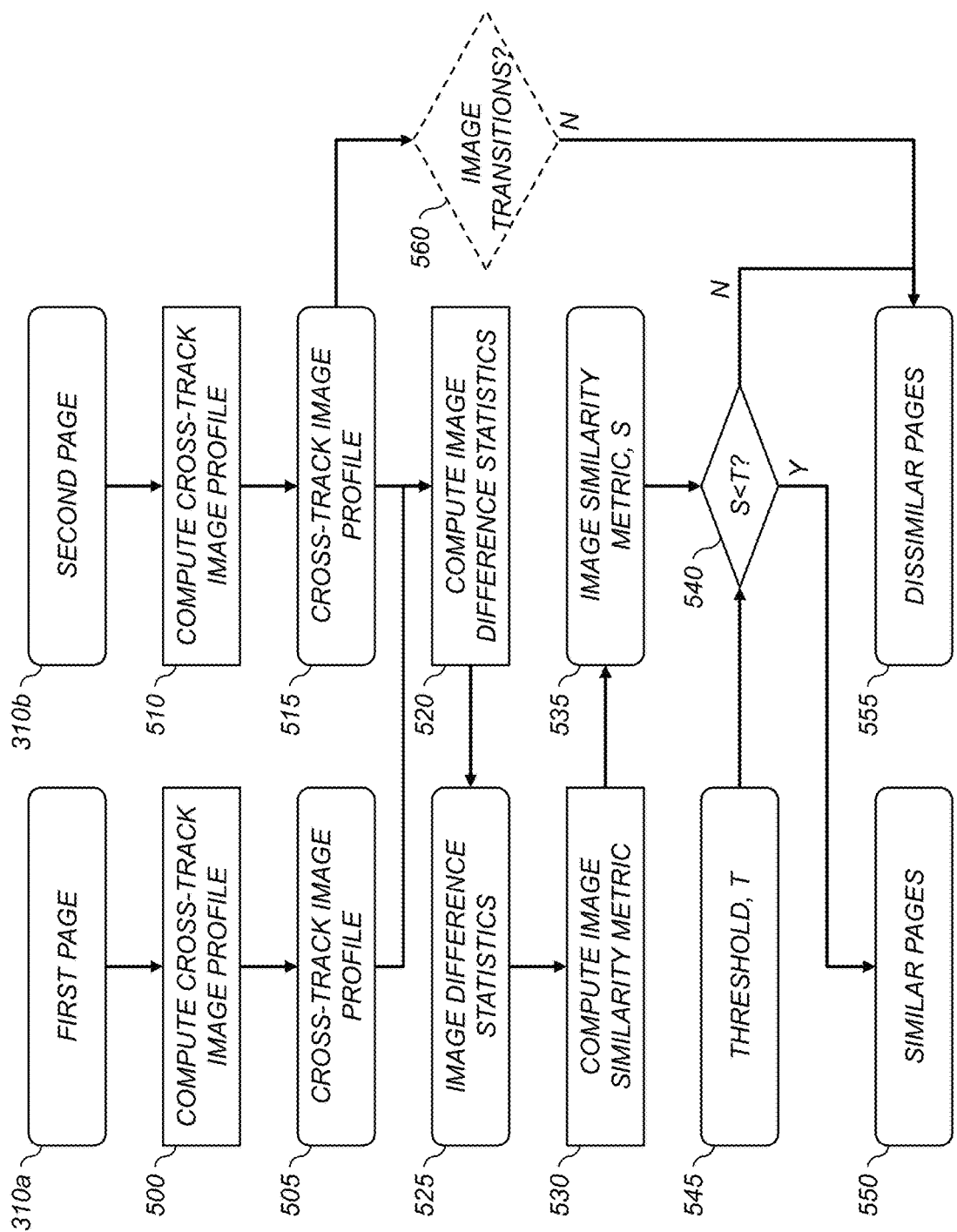
FIG. 5 is a flowchart of a method for analyzing image data for a sequence of pages to identify similar pages in accordance with an exemplary embodiment.

FIG. 5 shows a flowchart of a method for evaluating the similarity of a first page 310a and a second page 310b by automatically analyzing the corresponding image data. This method by the identify similar pages step 315 (FIG. 4) to evaluate the similarity of sequential images (e.g., the $i^{th}$ image and the $(i+1)^{th}$ images 310 in the print job 305). A compute cross-track image profile step 500 is used to analyze the first page 310a to determine a corresponding cross-track image profile 505, and a compute cross-track image profile step 510 is used to analyze the second page 310b to determine a corresponding cross-track image profile 515.

Generally, the compute cross-track image profile step 500 and the compute cross-track image profile step 510 will use the same process to determine the corresponding cross-track image profiles 505, 515. In an exemplary embodiment, the compute cross-track image profile steps 500, 510 determine the corresponding cross-track image profiles 505, 515 by averaging all of the pixels at a particular cross-track position:

$$P_i(x) = \frac{1}{N_y}\sum_{y=1}^{N_y} I_i(x, y) \qquad (1)$$

where $I_i(x,y)$ is the image data for the $i^{th}$ page 310, $P_i(x)$ is the corresponding cross-track image profile 505, x and y are the cross-track and in-track pixel positions, respectively, and Ny is the number of rows in the image data (i.e., the pixels in the in-track dimension).

Figure 6:
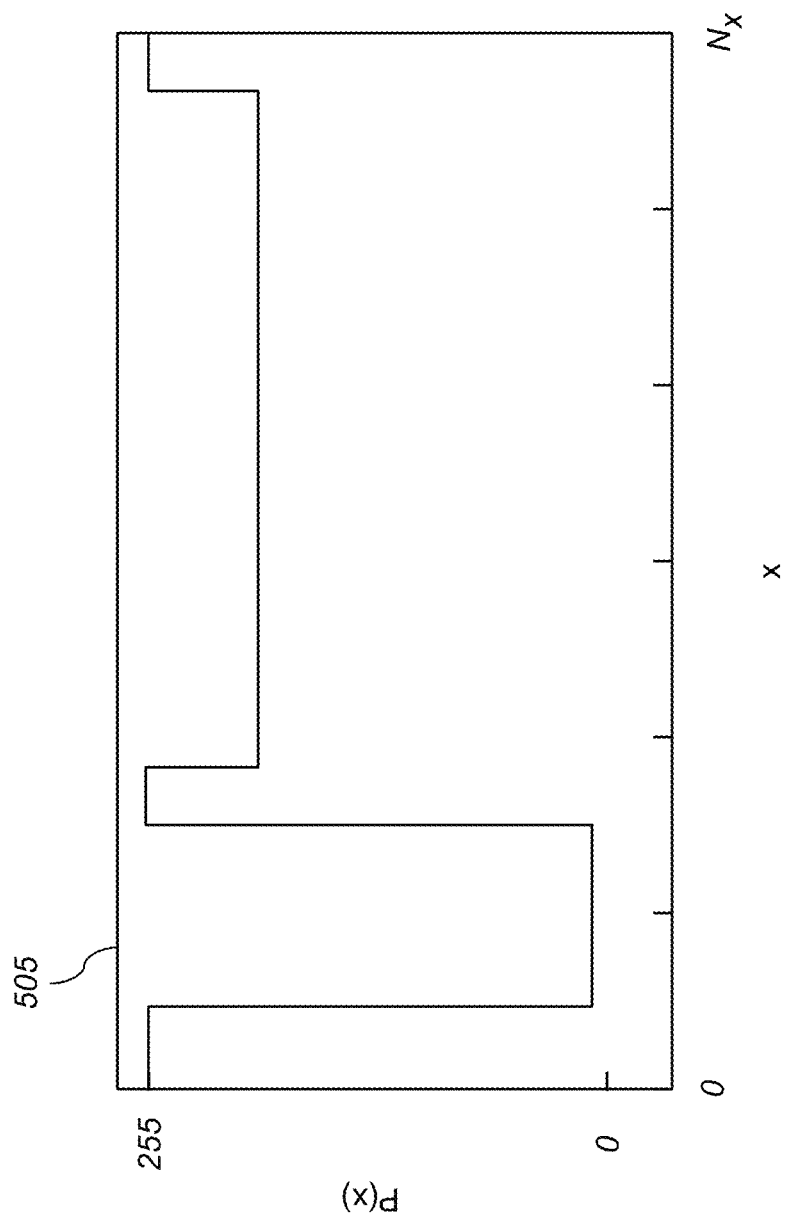
FIG. 6 illustrates a cross-track image profile determined from the image data for the exemplary page of FIG. 3A.

FIG. 6 shows a cross-track image profile 505 determined using Eq. (1) for the exemplary page 250 shown in FIG. 3A. It can be seen that toward the left edge of the image profile there is a large dip in the cross-track image profile 505 corresponding to the black bar in the image content which extends down the length of the page 250. There is also a shallower dip in the cross-track image profile 505 corresponding to the horizontal lines of text in the page.

A compute image difference statistics step 520 (FIG. 5) is used to analyze the cross-track image profiles 505, 515 to determine one or more image difference statistics 525. In an exemplary embodiments, the image difference statistics 525 include an RMS difference between the image profiles 505, 515, which is computed based on the profile difference $\Delta P_i$:

$$\Delta P_i(x) = P_{i+1} - P_i(x) \qquad (2)$$

The RMS difference can then be determined to provide the image difference statistic $S_i$:

$$S_i = \sqrt{\frac{1}{N_x}\sum_{x=1}^{N_x}(\Delta P_i(x))^2} \qquad (3)$$

In other embodiments, other types of image difference statistics can be determined such as the mean absolute difference between the image profiles, the standard deviation of the profile difference or the variance of the profile difference.

A compute image similarity metric step 530 is used to determine an image similarity metric 535 responsive to the image difference statistics 525. In the case where a single image difference statistic 525 is determined, the image similarity metric 535 can be equal to the image difference statistic 525, or can be determined by applying a transformation to the image difference statistic 525. In the case where a plurality of image difference statistics 525 are determined, they can be combined using a predefined function to determine the image similarity metric 535. In an exemplary embodiment, the image difference statistic $S_i$ determined using Eq. (3) is used directly as the image similarity metric 535 (S).

An image similarity test 540 compares the image similarity metric 535 to a predefined threshold 545 ($T_S$) to classify the pages to be either similar pages 550 or dissimilar pages 555. If the image similarly metric 535 is less than the predefined threshold ($S_i < T_S$) then the pages are classified to be similar. In an exemplary configuration, a threshold 545 of $T_S=30$ (in an 8-bit encoding having a maximum pixel value of 255) can be used when the image similarity metric 535 is determined using Eq. (3).

The burn-in artifacts that are being addressed by the method of the present invention are most visible where there are distinct transitions in the image density within the page which produce corresponding transitions in the response of the various system components (e.g., the fusing roller 62). Therefore, if the cross-track image profile 505 does not exhibit any distinct transitions in the image density, then it is generally not necessary to apply the pattern of page orientations 330 (FIG. 4). Referring back to FIG. 5, an optional image transitions test 560 can be applied to determine whether there are any distinct transitions. For example, the image transitions test 560 can determine the local range $R_i(x)$ of the cross-track image profile 505 as a function of cross-track position:

$$R_i(x) = \max_{x_j}(P_i(x_j)) - \min_{x_j}(P_i(x_j)) \quad (4)$$

where the max(•) and min(•) functions return the maximum and minimum values, respectively, of the cross-track image profile 505 in a window of cross-track positions $x_j$ around the cross-track position x:

$$(x-W/2) \leq x_j \leq (x+W/2) \quad (5)$$

where W is the window size. If the maximum local range across the page is less than a predefined threshold ($\max(R_i(x)) < T_R$) then the pages 310a, 310b are designated to be dissimilar pages 555 such that the pattern of page orientations 330 is not applied even if the image similarity test 540 determines that the pages 310a, 310b are identical or similar.

In some embodiments, the image transitions test 560 can be effectively combined with the image similarity test 540 by providing a single test which determines whether a set of images should be subject to the application of the image rotations. For example, in one such embodiment, an average cross-track profile $B_i(x)$ across a range of pages can be obtained by:

$$B_i(x) = \frac{1}{K}\sum_{k=0}^{K-1} \hat{P}_{(i-k)}(x) \quad (6)$$

where:

$$\hat{P}_i(x) = P_i(x) - p_0 \quad (7)$$

p0 is the midpoint of the code range for the image data (e.g., 128), and K is the number of pages being averaged. In an exemplary embodiment, the value of K is the same as the number of repeated page orientations N1, N2, in the pattern of page orientations 330 as will be discussed below. For example, in some configurations K=N1=N2=50.

If the pages being averaged have a high degree of dissimilarity, then the value of $B_i(x)$ will generally have a small magnitude so that it provides a measure of image similarity. Therefore, large magnitudes are indicative of image similarity. Furthermore, sharp transitions in the value of $B_i(x)$ as a function of x will be indicative of image content that is susceptible to the formation of image burn-in artifacts. As before, a local range $R_i(x)$ of the average cross-track image profile $B_i(x)$ can be determined using:

$$R_i(x) = \max_{x_j}(B_i(x_j)) - \min_{x_j}(B_i(x_j)) \quad (8)$$

The maximum of the local range values can then be treated as in image similarity metric:

$$S_{R,i} = \max_{x}(R_i(x)) \quad (9)$$

If the maximum local range across the page is greater than a predefined threshold ($S_{R,i} \geq T_R$), then it can be inferred that the page is similar to the nearby pages, and also that it contains distinct transitions, and it can therefore be designated to belong to the set of similar pages 320 (FIG. 4).

In another exemplary embodiment, an image similarity metric is computed based on determining a difference image $D_i(x,y)$ between the image data for sequential pages:

$$D_i(x,y) = I_{i+1}(x,y) - I_i(x,y) \quad (9)$$

where $I_i(x,y)$ is the image data associated with the $i^{th}$ page of the print job 305, $I_{i+1}(x,y)$ is the image data associated with the next page, and (x,y) is the row and column pixel address.

An image similarity metric can then be determined from the difference image by computing image difference statistics such as the mean absolute difference, the RMS difference, the standard deviation of the difference image or the variance of the difference image. For example, an image similarity metric $S_{D,i}$ for the $i^{th}$ page based on the RMS difference can be determined using the equation:

$$S_{D,i} = \sqrt{\frac{1}{N_x N_y}\sum_{x=1}^{N_x}\sum_{y=1}^{N_y}(D_i(x,y))^2} \quad (10)$$

where $N_x$ and $N_y$ are the number of pixels in the image data in the cross-track and in-track directions, respectively. Two sequential pages are determined to be similar if the image similarity metric is less than a predefined threshold $T_S$.

Returning to a discussion of FIG. 4, a print similar pages step 325 is used to print the identified set of similar pages 320. In an exemplary embodiment, the print similar pages step 325 includes a rotate page orientations step 335, which rotates the page orientations of the similar pages 320 according to a predefined pattern of page orientations 330. In an exemplary configuration, the rotate page orientations step 335 can be performed in the DFE. The pattern of page orientations 330 preferably includes a first page orientation and a second page orientation where the image or image data to be printed is rotated 180 degrees relative to the first page orientation. The pattern of page orientations 330 specifies a page orientation that should be used for each of the similar pages. When the pattern of page orientations 330 indicates that a particular similar page should be printed with the first page orientation, the unmodified image data is stored in the reoriented similar pages. When the pattern of page orientations 330 indicates that a particular similar page should be printed with the second page orientation, the image data is rotated by 180 degrees and stored in the reoriented similar pages.

Figure 7:
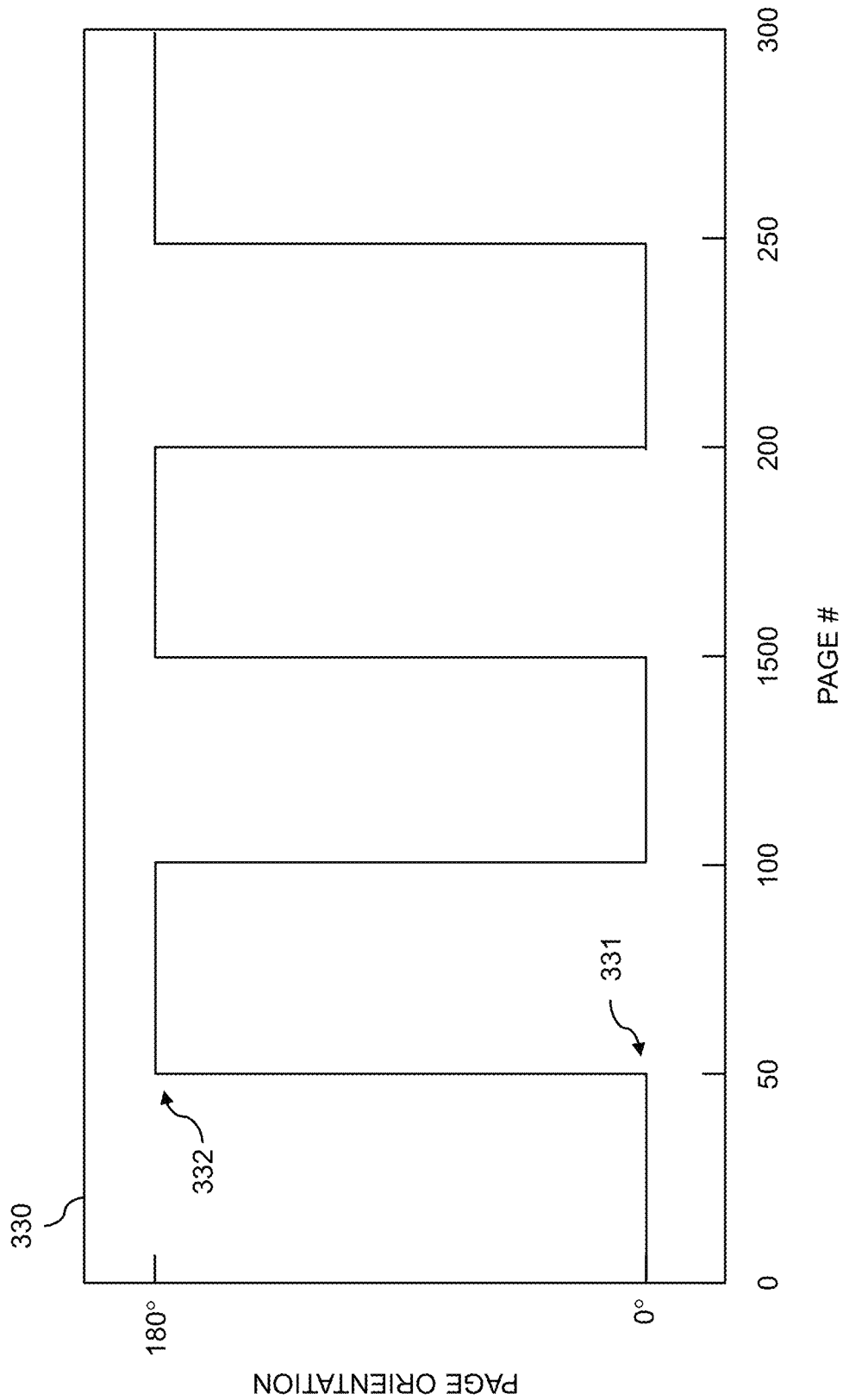
FIG. 7 illustrates an exemplary pattern of page orientations.

In an exemplary embodiment, the pattern of page orientations 330 is a repeating pattern which includes $N_1$ pages in the first orientation followed by $N_2$ pages in the second orientation, where $N_1$ and $N_2$ are predefined integers. Preferably, $N_1$ and $N_2$ are in the range of 10 to 500, and more preferably are in the range of 50 to 200. An exemplary pattern of page orientations 330 is shown in FIG. 7 where $N_1=N_2=50$. The pattern of page orientations 330 indicates which pages should be printed with a first page orientation 331, and which should be printed with a second page orientation 332. In other embodiments, the pattern of page orientations 330 can take other forms including non-repeating patterns.

Returning to a discussion of FIG. 4, a print reoriented similar pages step 345 is used to print the reoriented similar pages 340, providing a set of printed similar pages 350. The printed similar pages 350 will include some pages printed with the first page orientation 331 and some pages printed with the second page orientation 332 in accordance with the pattern of page orientations 330.

The printed similar pages 350 will typically be directed into a finishing system 70 (FIG. 1) which includes an output tray 69. The finishing system 70 is sometimes referred to as a finisher. Since the printed similar pages 350 in the first page orientation 331 will be intermixed with the printed similar pages 350 in the second orientation 332, in some embodiments it can be desirable for the finishing system 70 to position the printed similar pages 350 differently depending on their page orientation. This can be accomplished using an optional adjust position of printed similar pages step 358 in which the finishing system 70 positions the pages printed in the first orientation 331 in a first position and the pages printed in the second orientation 332 in a second position.

Figure 8:
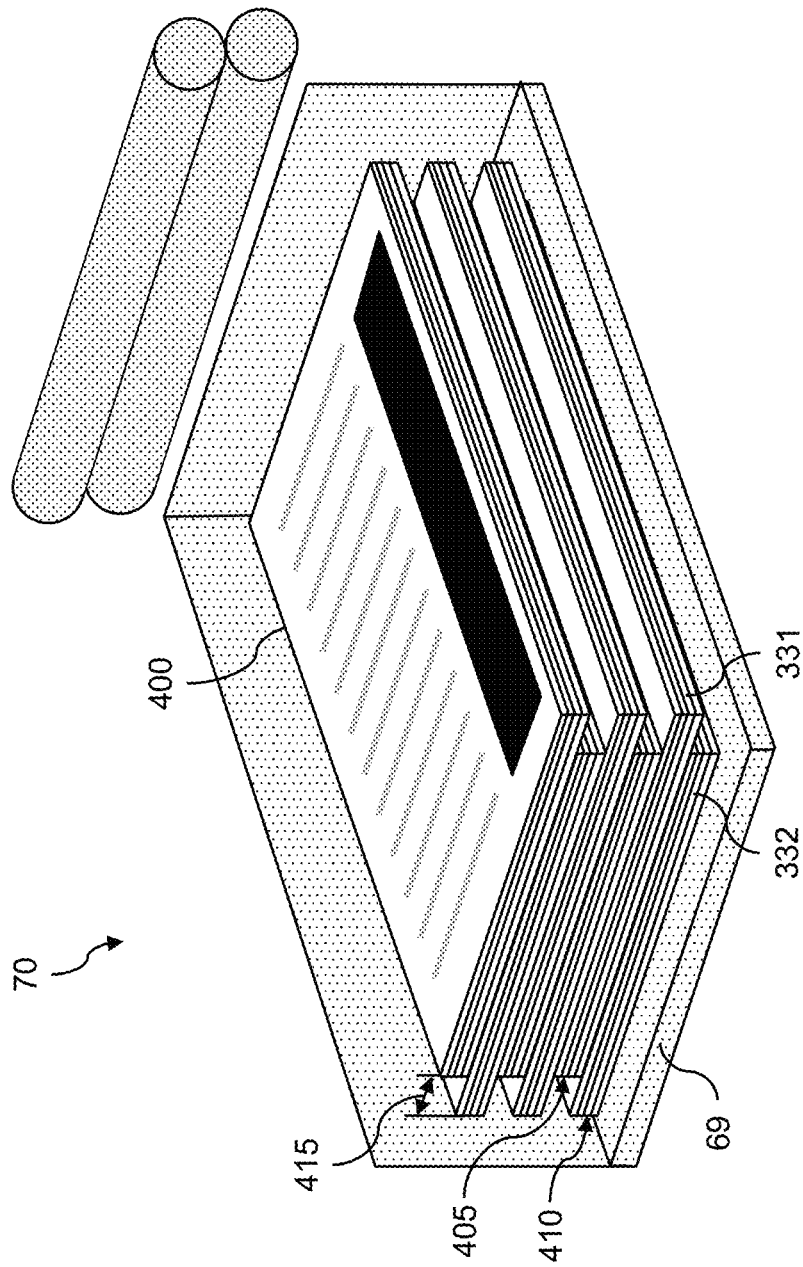
FIG. 8 illustrates a finishing system which offsets the lateral positions of the printed pages with different orientations.

In an exemplary embodiment of the adjust position of printed similar pages step 355, the finishing system 70 deposits the pages printed in the first orientation 331 and the second orientation 332 into a single output tray 69 in first and second positions, respectively, wherein the second position is offset laterally relative to the first position in the output tray. This is illustrated in FIG. 8 which shows a finishing system 70 having an output tray 69 with a stack of printed similar pages 400. The stack of printed similar pages 400 includes pages printed in the first orientation 331 positioned in a first position 405 and pages printed in the second orientation 332 positioned in a second position 410. The second position 410 is offset laterally from the first position 405 by a lateral offset 415, enabling an operator to easily separate the pages printed in the first and second orientations 331, 332 so that they can be manually reoriented into a consistent orientation.

Figure 9:
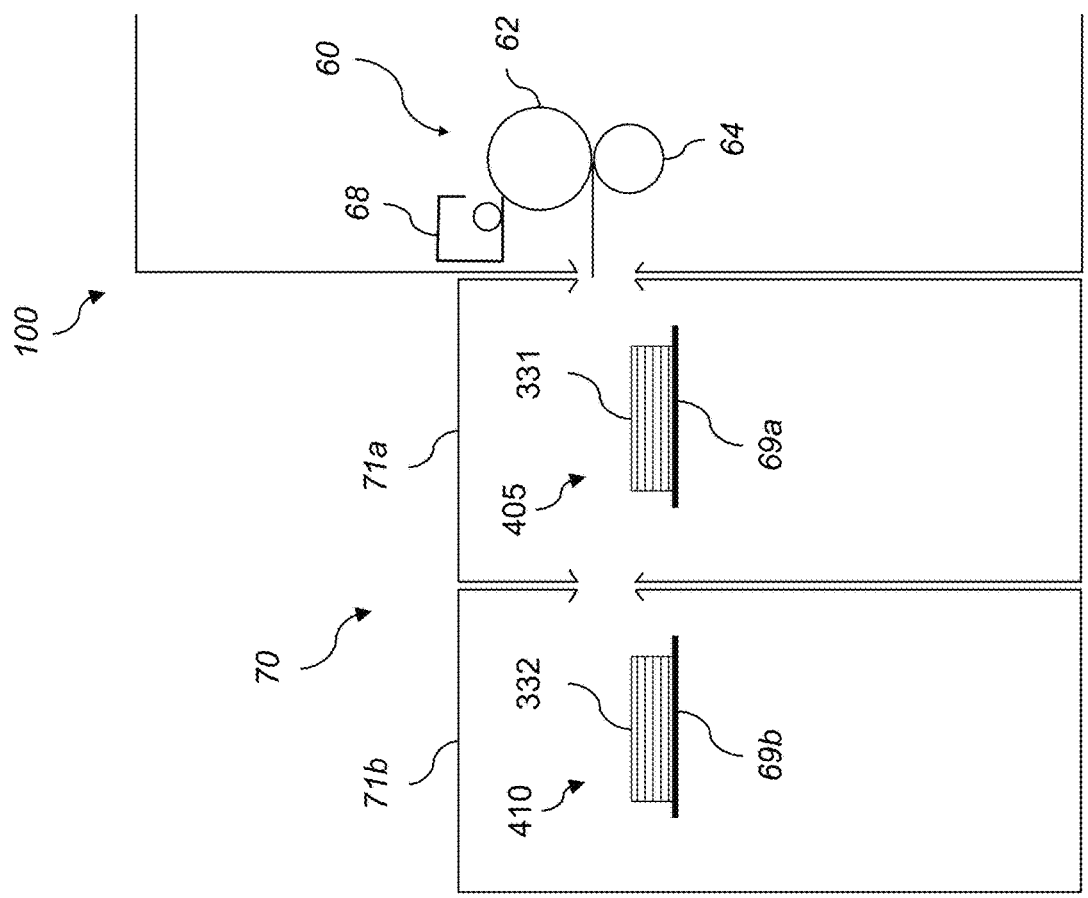
FIG. 9 illustrates a finishing system which sends the printed pages with different orientations to different output trays.

In another embodiment of the adjust position of printed similar pages step 355, the finishing system 70 deposits the pages printed in the first orientation 331 into a first output tray 69a and deposits the pages printed in the second orientation 332 into a second output tray 69b. This is illustrated in FIG. 9 which shows a printer 100 with a finishing system 70 having two stacker modules 71a, 71b with respective output trays 69a, 69b. The pages printed in the first orientation 331 are directed into the first stacker module and deposited in the first output tray 69a in first position 405. The pages printed in the second orientation 332 pass through the first stacker module and are directed into the second stacker module 71b and deposited in the second output tray 69b in second position 410. This configuration is particularly appropriate for scenarios where all of the similar pages 320 (FIG. 4) are identical such that the order that they are stacked in the finisher 70 is not important. In this case, the operator can manually reorient the stack of printed pages from the second output tray 69b before combining it with the stack of printed pages from the first output tray 69a to form a single stack of pages with a consistent orientation. While the first and second output trays 69a, 69b in FIG. 9 are shown in horizontally adjacent positions, it will be recognized that in other embodiments they can be arranged in other configurations. For example, some printers have a plurality of output trays at different vertical positions (i.e., one above the other) and the pages can be directed into the output trays using appropriate media guides or by raising or lowering the output trays within the finishing system 70 so that the appropriate output tray is aligned with the media path.

Figure 10:
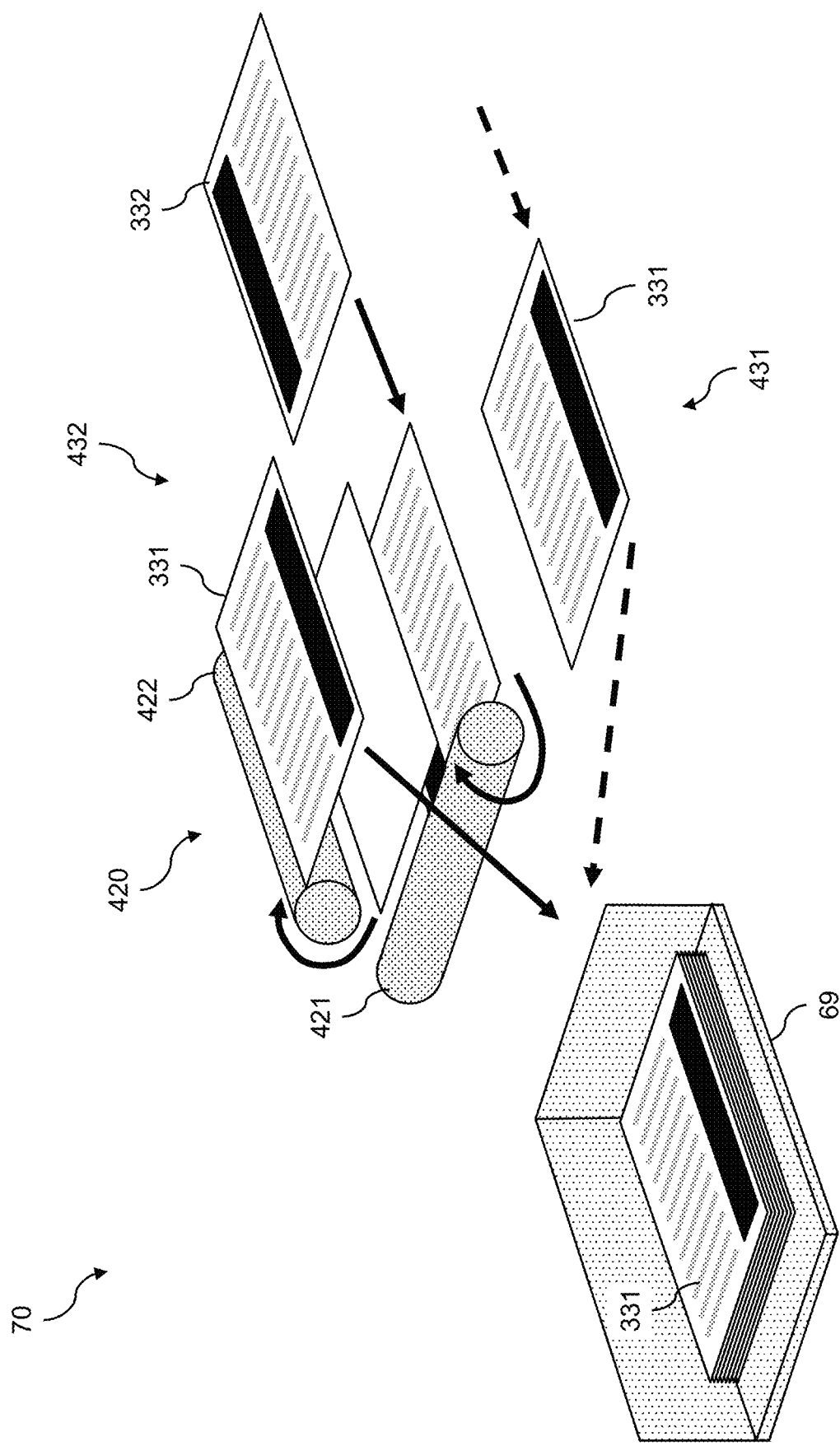
FIG. 10 illustrates a finishing system which rotates the orientation of the pages printed with the second orientation.

In another embodiment of the adjust position of printed similar pages step 355, the finishing system 70 rotates the pages printed in the second orientation 332 using an orientation rotator 420 so that they match the orientation of the pages printed in the first orientation 331 before stacking them in the output tray 69 as illustrated in FIG. 10. The orientation rotator 420 can use any appropriate means known in the art to physically rotate the orientation of the pages printed in the second orientation 332. This is typically accomplished using components such as roller, belts and media guides configured to provide a media transport path in which the orientation is rotated. In the illustrated configuration pages printed in the first orientation 331 are directed along a first paper path 431 (shown with dashed arrows) into the output tray 69. Pages printed in the second orientation 332 are directed along a second paper path 432 (shown with solid arrows) which takes the printed page through the orientation rotator 420. The orientation rotator 420 includes a first roller 421 and a second roller 422. The second paper path 432 directs the printed pages around the first roller 421 which turns the printed pages over so that the front face is facing down and the leading edge is to the right in the figure. The printed pages are then directed around the second roller 422 which turns the printed pages over again so that the front face is now facing up but the page has been reoriented so that it is now in the first orientation 331. The rotated pages in the first orientation 331 are then directed into the paper tray 69. One skilled in the art will recognize that the paper paths 431, 432 will also include other components such as paper guides that are not shown in FIG. 10 for clarity.

Figure 11:
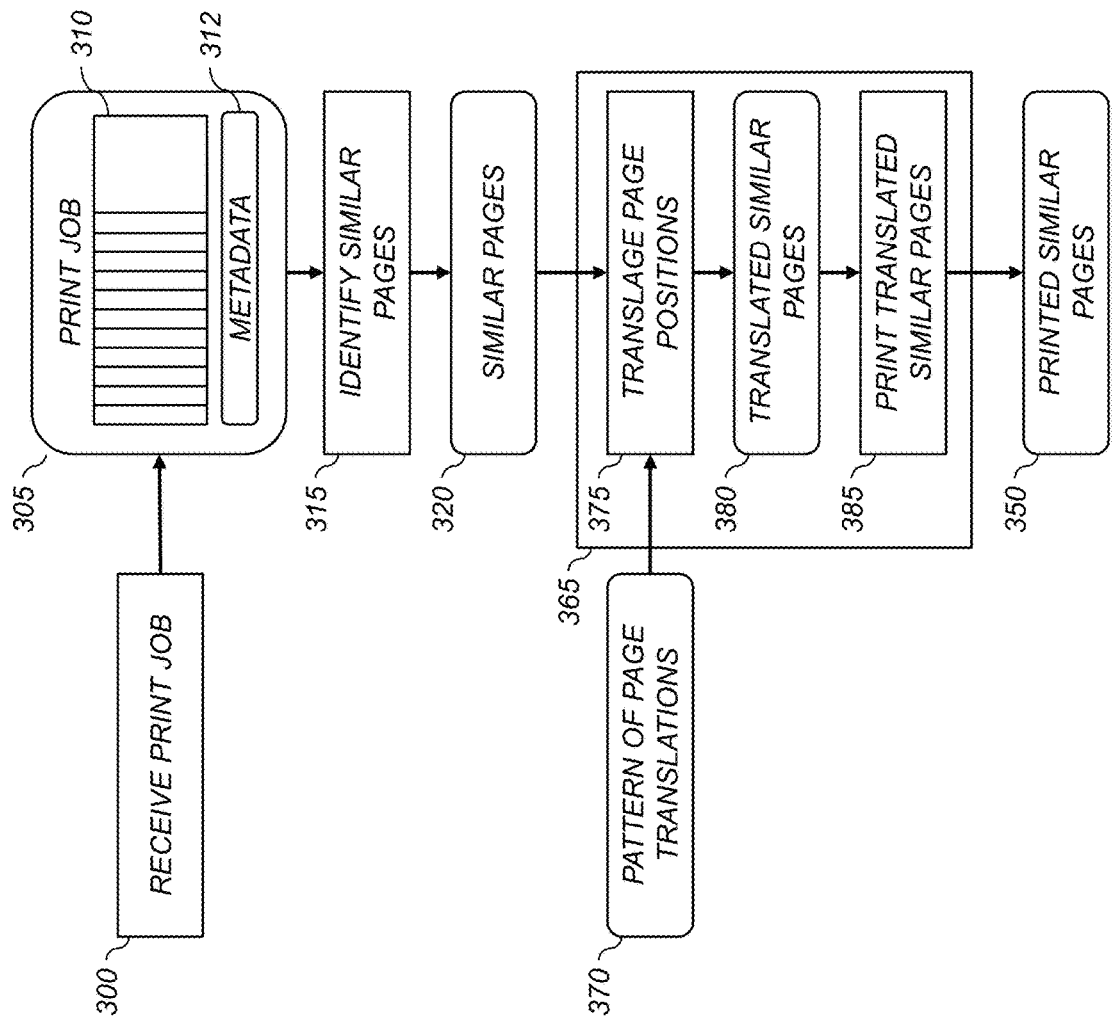
FIG. 11 shows a flowchart of a method for printing similar pages using a pattern of page translations in accordance with an alternate embodiment.
Figure 12:
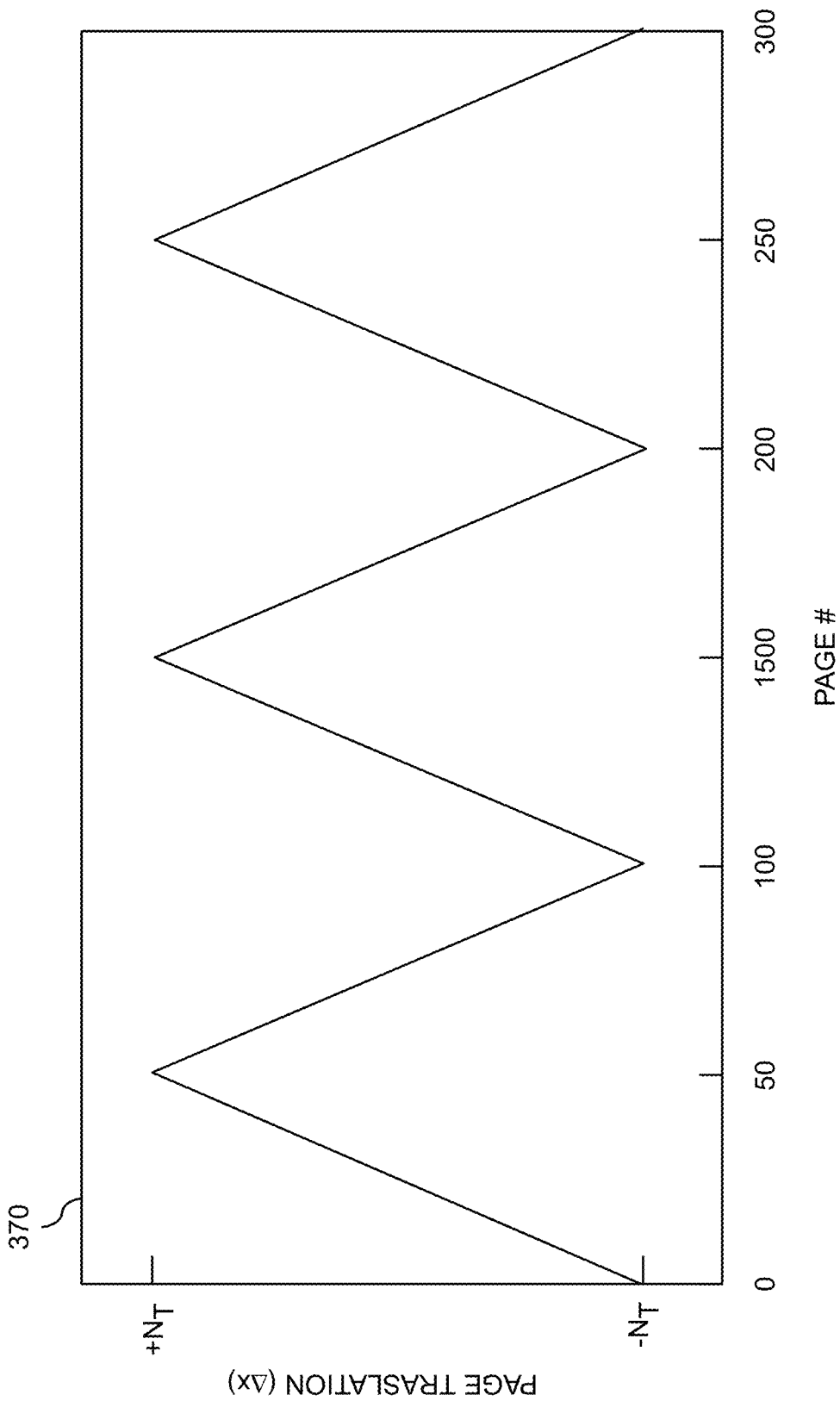
FIG. 12 illustrates an exemplary pattern of page translations.

In a variation of the method described with reference to FIG. 4, rather than rotating the orientation of the similar pages 320 to reduce the burn-in artifacts, the image data can be repositioned on the page by applying a lateral translation to the image data in the cross-track direction and/or the in-track direction. This alternate embodiment is illustrated in FIG. 11. In this configuration, the print similar pages step 325 of FIG. 4 is replaced by an analogous print similar pages step 365 which applies a pattern of page translations 370 using a translate page positions step 375 to provide a set of translated similar pages 380. The translated similar pages 380 are then printed by a print translated similar pages step 385 to form the printed similar pages 350. In an exemplary configuration, the pattern of page translations 370 are lateral translations in the cross-track (x) direction such as those illustrated in FIG. 12. In this example, the translations vary continuously within a range of +/−$N_T$ pixels from the nominal position. The value of $N_T$ is chosen such that the translated images don't have objectionably large changes in the image margins in the printed pages 350. For example, translations of about ¼ inch may be acceptable in some applications. For a 600 dpi printer, this would correspond to $N_T$=150 pixels. In the example of FIG. 12, the pattern of page translations 370 is a periodic pattern which repeats every 100 pages. In other embodiments, the pattern of page translations 370 can have other repeat periods or can take other forms such as random or pseudo-random patterns.

An advantage of the FIG. 11 embodiment is that the printed pages 350 do not need to be reoriented since they will all have a consistent orientation. However, the reduction in the image burn-in artifacts may be less than with the method of FIG. 4 because rather than shifting the dark image content to a completely different part of the printed page, it is merely shifted by a relatively small displacement. This will have the effect of blurring out any hard edges in the burn-in artifacts, thereby reducing the visibility of the artifacts.

Within the context of the present invention, lateral translations are defined to be translations within the plane of the page. In the example of FIG. 12, the lateral translations are in the cross-track direction. In other embodiments, the lateral translations can be in the in-track direction, or in both the cross-track and in-track directions. In this case, the pattern of page translations 370 will include a Δy component. For cases where the burn-in artifacts are primarily caused by the fuser module 60, the cross-track translations will generally provide the most significant improvements, but for burn-in artifacts which originate in other subsystems the in-track translations can also provide significant improvements.

Figure 13B:
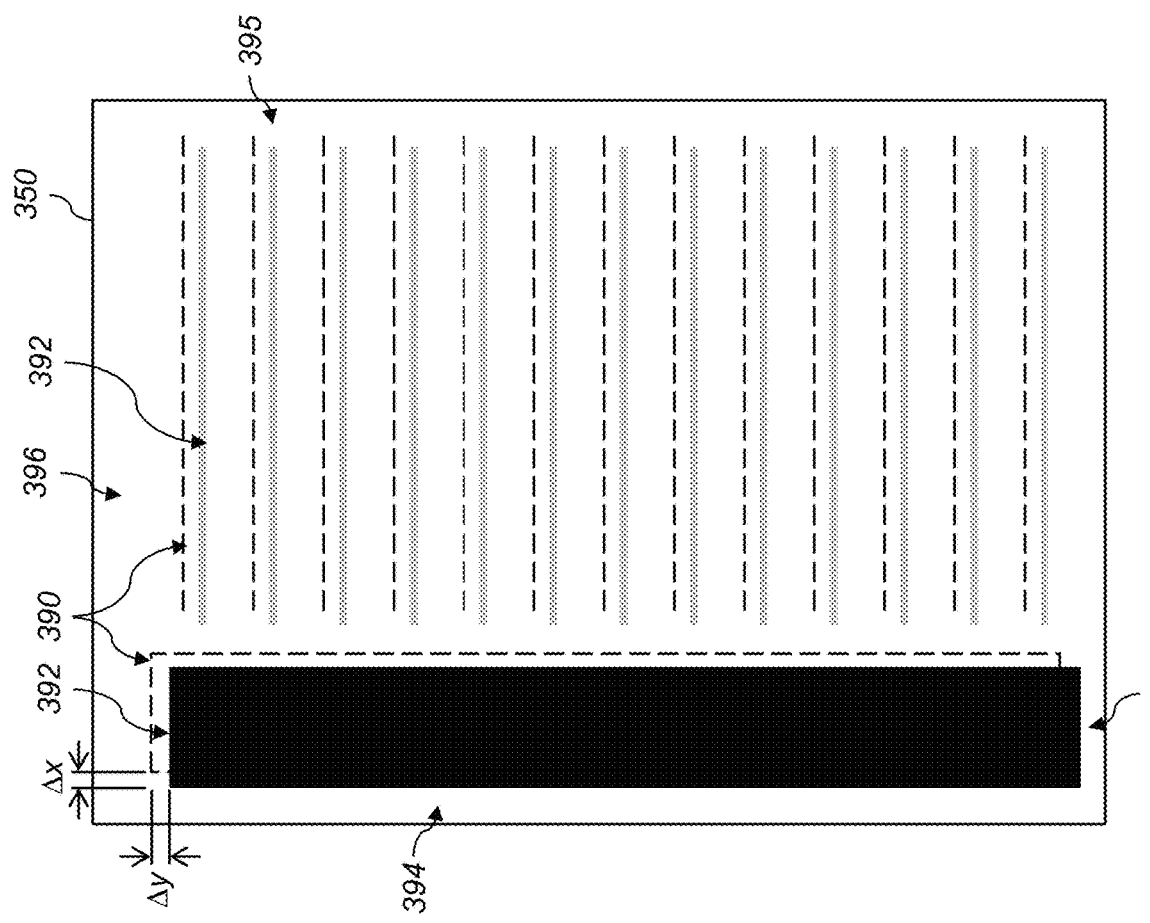
FIG. 13B illustrates an example of a printed similar page where the image content is printed in a translated position.
Figure 13A:
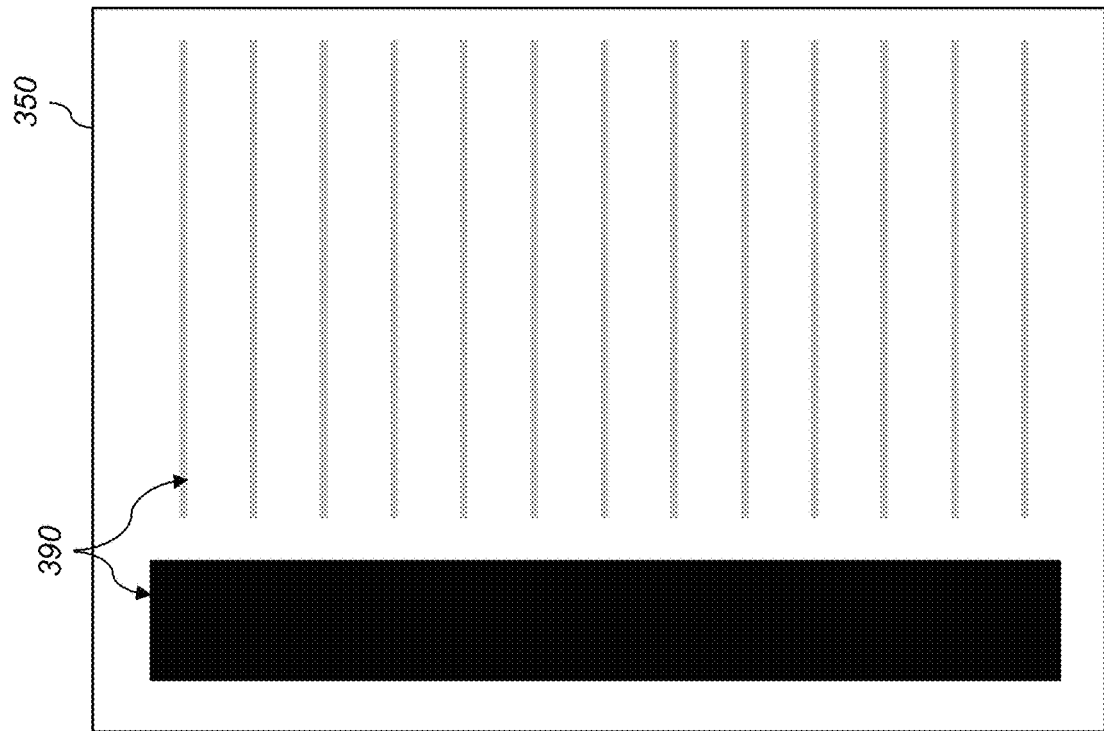
FIG. 13A illustrates an example of a printed similar page where the image content is printed in a nominal position.

FIG. 13A shows an example of a printed similar page 350 having image content printed in a nominal content position 390. FIG. 13B shows an example of a printed similar page 350 where the image content has been translated to a translated content position 392 in accordance with the method of FIG. 11. The translated content position 392 is offset in the cross-track direction by a cross-track translation Δx and in the in-track direction by an in-track translation Δy relative to the nominal content position 390. The result is that the image content is shifted relative to the page borders. In the illustrated example, the effect is to decrease the size of the left margin 394 and the top margin 296 and to increase the size of the right margin 396 and the bottom margin 397. The cross-track translation Δx and the in-track translation Δy will be varied for each similar page 320 (FIG. 11) in accordance with the pattern of page translations 370.

In some embodiments, the similar pages can be modified by both the pattern of page orientations 330 as in FIG. 4 and the pattern of page translations 370 in FIG. 11. This can further reduce the magnitude of the burn-in artifacts beyond what would be possible with the FIG. 4 and FIG. 11 embodiments alone.

In embodiments of the present inventions, a controller (such as the logic and control unit 99 in FIG. 1) is used to implement the various operations such as the identify similar pages step 315 and the rotate page orientations step 335 of FIG. 4. In some embodiments the controller is a single processing unit operated by appropriate software. In other embodiments, the controller can include a plurality of different processing units each of which implement a portion of the operations.

The invention has been described in detail with particular reference to certain preferred embodiments thereof, but it will be understood that variations, combinations, and modifications can be effected by a person of ordinary skill in the art within the spirit and scope of the invention.

PARTS LIST 31 printing module
32 printing module
33 printing module
34 printing module
35 printing module
38 print image
39 fused image
40 supply unit
42 receiver
42a receiver
42b receiver
50 transfer subsystem
60 fuser module
62 fusing roller
64 pressure roller
66 fusing nip
68 release fluid application substation
69 output tray
69a output tray
69b output tray
70 finishing system
71a stacker module
71b stacker module
81 transport web
86 cleaning station
99 logic and control unit
100 printer
111 imaging member
112 intermediate transfer member
113 transfer backup member
201 first transfer nip
202 second transfer nip
206 photoreceptor
210 charging subsystem
211 meter
212 meter
213 grid
216 surface
220 exposure subsystem
225 development subsystem
226 toning shell
227 magnetic core
240 power source
250 page
252 dark image content
254 light image content
256 roughened surface
260 image burn-in artifacts
300 receive print job step
305 print job
310 page
310a first page
310b second page
312 metadata
315 identify similar pages step
320 similar pages 325 print similar pages step
330 pattern of page orientations
331 first page orientation
332 second page orientation
335 rotate page orientations step
340 reoriented similar pages
345 print reoriented similar pages step
350 printed similar pages
355 adjust position of printed similar pages step
365 print similar pages step
370 pattern of page translations
375 translate page positions step
380 translated similar pages
385 print translated similar pages step
390 nominal content position
392 translated content position
394 left margin
395 right margin
396 top margin
397 bottom margin
400 stack of printed similar pages
405 first position
410 second position
415 lateral offset
420 orientation rotator
421 roller
422 roller
431 first paper path
432 second paper path
500 compute cross-track image profile step
505 cross-track image profile
510 compute cross-track image profile step
515 cross-track image profile
520 compute image difference statistics step
525 image difference statistics
530 compute image similarity metric step
535 image similarity metric
540 image similarity test
545 threshold
550 similar pages
555 dissimilar pages
560 image transitions test

The invention claimed is:

1. A method for reducing image burn-in artifacts in an electrophotographic printing system, comprising:
receiving a print job including image data for a set of pages to be printed with the electrophotographic printing system;
determining that the image data for a sequence of pages in the print job are similar; and
determining printing data to enable a print engine to print the similar pages using a pattern of lateral translations wherein the image data is laterally translated such that it is printed at a different lateral position on the printed page.

2. The method of claim 1, wherein the pattern of lateral translations includes a pattern of cross-track translations.

3. The method of claim 1, wherein the pattern of lateral translations includes a pattern of in-track translations.

4. The method of claim 1, wherein the pattern of lateral translations is a periodic pattern.

5. The method of claim 1, wherein the pattern of lateral translations is a random or pseudo-random pattern.

6. The method of claim 1, wherein the image data for a sequence of pages are determined to be similar based on metadata associated with the print job indicating that the print job includes multiple copies of the same page having the same image data.

7. The method of claim 1, wherein the image data for a sequence of pages are determined to be similar by automatically analyzing the image data to compute a predefined image similarity metric, and designating sequential pages to be similar by comparing the image similarity metric to a predefined threshold.

8. The method of claim 7, wherein computing the image similarity metric includes:
computing a cross-track image profile from the image data for sequential pages;
computing image difference statistics from the cross-track image profiles; and
computing the image similarity metric responsive to the image difference statistics.

9. The method of claim 8, wherein the image difference statistics include a mean absolute difference between the cross-track image profiles, an RMS difference between the cross-track image profiles, a standard deviation of the difference between the cross-track image profiles or a variance of the difference between the cross-track image profiles.

10. The method of claim 7, wherein computing the image similarity metric includes:
computing cross-track image profiles $\hat{P}_i(x)$ from the image data $I_i(x,y)$ for a set of sequential pages, where:

$$\hat{P}_i(x) = \frac{1}{N_y}\sum_{y=1}^{N_y} I_i(x, y) - p_0,$$

i is the image number, x and y are the cross-track and in-track pixel positions, respectively, Ny is the number of rows in the image data, and p0 is the midpoint of the code value range for the image data; determining an average cross-track profile $B_i(x)$ by averaging the cross-track image profiles for the set of K sequential pages using the equation, where:

$$B_i(x) = \frac{1}{K}\sum_{k=0}^{K-1} \hat{P}_{(i-k)}(x),$$

and K is the number of pages being averaged; computing a local range of the average cross-track image profile in a window of cross-track positions as a function of cross-track position, where:

$$R_i(x) = \max_{x_j}(B_i(x_j)) - \min_{x_j}(B_i(x_j)),$$

the max(•) and min(•) functions return the maximum and minimum values, respectively, of the average cross-track profile in a window of cross-track positions $x_j$ given by $(x-W/2) \leq x_j \leq (x+W/2)$;
computing the image similarity metric $S_i$ by determining a maximum of the local range of the average cross-track image profile, where $$S_i = \max_x(R_i(x))$$

and the max(•) function determines the maximum value across the range of x values.

\* \* \* \* \*